MAGNETIC CORE SHIFT REGISTER

Filed Nov. 30, 1962

2 Sheets-Sheet 1

INVENTORS E. E. NEWHALL
J. R. PERUCCA

BY Lucian C. Canepa

ATTORNEY

April 2, 1968 E. E. NEWHALL ETAL 3,376,562

MAGNETIC CORE SHIFT REGISTER

Filed Nov. 30, 1962 2 Sheets-Sheet 2

United States Patent Office 3,376,562 Patented Apr. 2, 1968

3,376,562
MAGNETIC CORE SHIFT REGISTER

Edmunde E. Newhall, Brookside, and James R. Perucca, Sayreville, N.J., assignors to Bell Telephone Laboratories, Incorporated, New York, N.Y., a corporation of New York Filed Nov. 30, 1962, Ser. No. 241,339
15 Claims. (Cl. 340—174)

This invention relates to a magnetic core circuit and, more specifically, to a multiapertured magnetic core arrangement which functions as a shift register.

Electronic circuits which register a plurality of information digits at discrete storage locations and advance the stored information at periodic time intervals are well known. These circuits typically include a plurality of shifting stages which receive a binary input signal and supply a corresponding digit to their output terminals which is delayed in time from the input signal. One extensively employed shift register embodiment includes a plurality of set-reset flip-flop circuits in one-to-one correspondence with the maximum number of input information digits to be stored in the register at any single time. A clock source is connected to either the set or reset terminal of each flip-flop, and the output of each register stage is connected by a delay element to the remaining input terminal of the next succeeding stage, with an input information source being connected to the second input terminal of the first stage flip-flop. Information is then registered and propagated down the chain of shift register stages by alternate energizations supplied by the information source and the clock source.

It is significant to note, however, that the abovedescribed shift register as well as other prior art registers requires at least one bistable arrangement, a delay element, or both for each stage of register capacity. Therefore, the number of circuit elements increases virtually in direct proportion to the register capacity, with a multistage register thereby employing a relatively large number of components.

It is therefore an object of the present invention to provide an improved magnetic shift register arrangement.

More specifically, an object of the present invention is the provision of an improved magnetic core shift register which stores information digits in a plurality of register stages, and advances the stored information at discrete time intervals.

Another object of the present invention is the provision of a highly reliable magnetic core shift register which may advantageously be inexpensively and easily constructed, and is capable of a relatively high operational repetition rate.

These and other objects of the present invention are realized in a specific, illustrative, magnetic core shift register which includes six ferromagnetic, multiapertured cores. Each core includes two driving legs, each shunted by a magnetic member of a like cross-sectional area. Two cross legs are provided to complete a magnetic path which also includes the driving legs. Each cross leg member has a uniform cross-sectional area which is twice the magnitude of that possessed by each of the driving and shunt legs and, corresponding to an *n*-stage shift register, *n* apertures are centrally located along the long axes of the cross legs of each core.

Each stage of the register comprises six core apertures including one from each core, with first and second short-circuited windings being respectively coupled to the apertures in the first three, and third through fifth cores. In addition, a third short-circuited winding couples the apertures included in the last two cores of each stage to the first core aperture of the succeeding stage. Each of the above windings is coupled to the ferromagnetic material on each side of the corresponding core aperture in an opposite polarity. Binary input information is supplied to an input winding coupled to the first apertures of the first shift register stage, and is manifested by the presence of an input current flowing in one of the two possible directions.

Information is stored and advanced in the register in response to pulses supplied by a three-phase clock source which selectively switches and resets each of the six multiapertured cores between a saturated and a neutral magnetic condition.

It is thus a feature of the present invention that a magnetic core shift register include a fixed number of cores independent of the number of information digits to be stored and advanced therein.

It is another feature of the present invention that a magnetic core shift register include a plurality of multiapertured, square loop, ferromagnetic cores, each core including a cross leg and a driving leg which completes a closed magnetic path which includes the cross leg, a plurality of apertures included in the cross leg, and that the register further include a plurality of short-circuited coupling windings which are linked to selected apertures included in the plurality of cores, each of the coupling windings being linked to the ferromagnetic material on each side of a corresponding core aperture in an opposite polarity.

A complete understanding of the present invention and of the above and other features, advantages and variations thereof may be gained from a consideration of the following detailed description of an illustrative embodiment thereof presented hereinbelow in conjunction with the accompanying drawing, in which.

Figure 1:
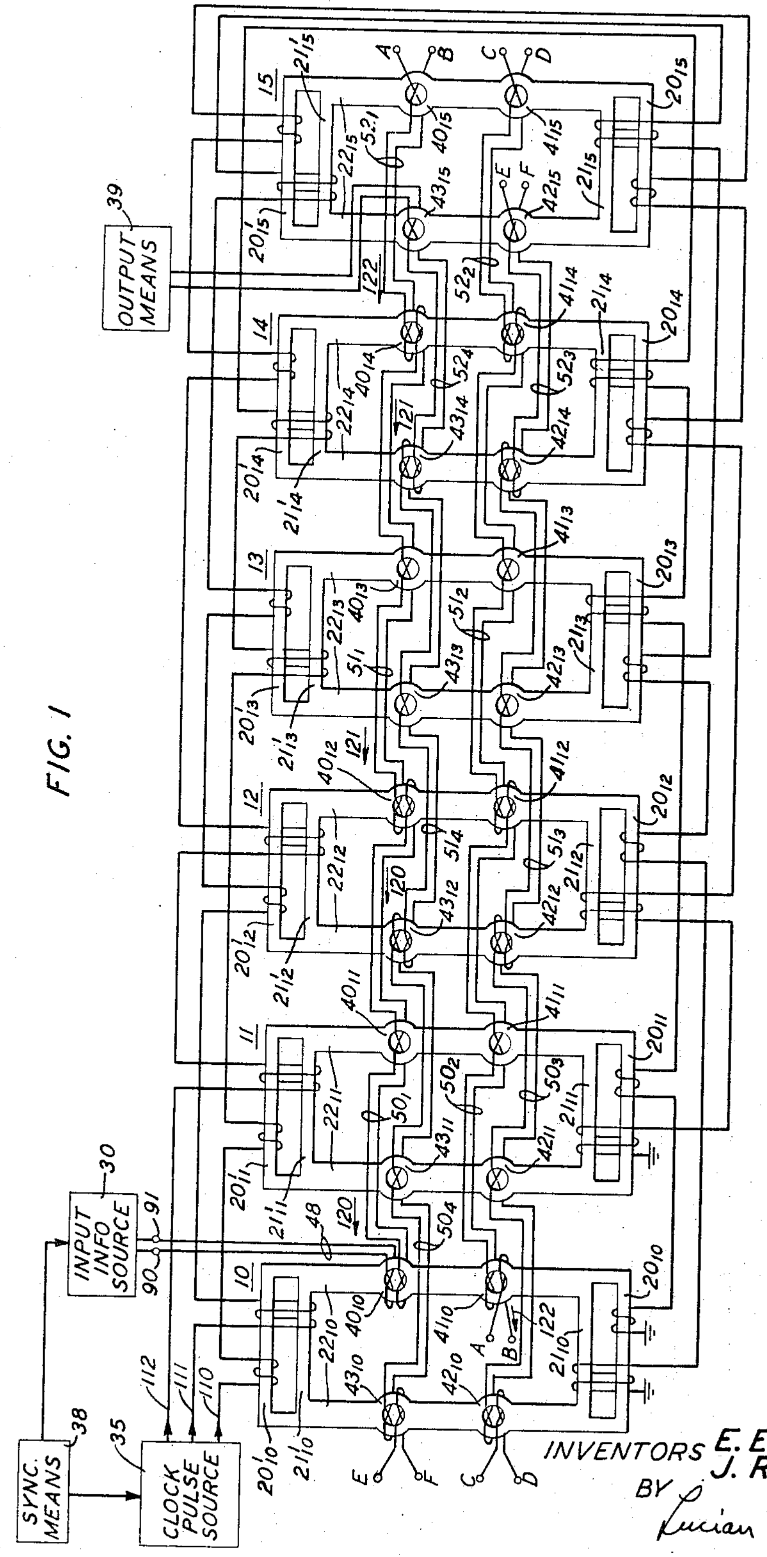
FIG. 1 is a diagram of a specific, illustrative multiapertured core shift register which embodies the principles of the present invention.

Referring now to FIG. 1, there is shown a specific illustrative, magnetic core shift register which includes six multiapertured, square loop, ferromagnetic cores 10 through 15. Each core includes two driving legs 20 and 20', each connected in parallel with a shunt leg 21 and 21', respectively. In addition, each core includes two cross legs 22, each connecting a junction of the driving leg 20 and the shunt leg 21 with the corresponding junction of the legs 20' and 21'. Each of the cross legs 22 has a uniform cross-sectional area which is twice the magnitude of that possessed by each of the driving legs 20 and 20' and the shunt legs 21 and 21', all of the aforementioned magnetic legs having a like value of remanent saturation. Hence, each of the cross legs 22 has twice the flux carrying capacity of either of the driving legs 20 and 20' or the shunt legs 21 and 21'.

A plurality of apertures 40 through 43 are centrally located on the long axes of the cross legs 22 included in each of the cores 10 through 15. The aperture 40 included in each of the cores 10 through 15 is associated with the first shift register stage and the apertures 41 through 43 included in the cores 10 through 15 are respectively included in the second through fourth shift register stages.

A plurality of short-circuited intrastage windings $50_1$ through $50_4$, and $51_1$ through $51_4$, and a plurality of short-circuited interstage windings $52_1$ through $52_4$ are provided. It is noted at this point that each of the subscripts 1 through 4 employed above is used to designate a particular one of the four shift register stages included in the FIG. 1 arrangement. It is also noted that each one of a plurality of additional circuit elements identified above is further designated by one of the subscripts 10 through 15 indicating the particular core of the plurality 10 through 15 with which it is associated. Hence, for example, the leg $21'_{12}$ corresponds to the shunt leg 21' which is included in the multiapertured core 12, and the winding $51_1$ corresponds to the intrastage winding 51 employed in the first register stage.

Each stage of the shift register comprises six core apertures including one from each core, and three short-circuited coupling windings. The first stage includes each of the apertures $40_{10}$ through $40_{15}$, the intrastage coupling windings $50_1$ and $51_1$, and the interstage coupling winding $52_1$. In a similar manner the apertures $41_{10}$ through $41_{15}$ and the windings $50_2$, $51_2$ and $52_2$; the apertures $42_{10}$ through $42_{15}$ and the coupling windings $50_3$, $51_3$ and $52_3$; and the apertures $43_{10}$ through $43_{15}$ and the short-circuited coupling windings $50_4$, $51_4$ and $52_4$ are respectively included in the second through fourth register stages.

Examining the first shift register stage, it is seen that the short-circuited intrastage winding $50_1$ is coupled to the apertures $40_{10}$, $40_{11}$ and $40_{12}$. The short-circuited coupling winding $51_1$ is also connected to the aperture $40_{12}$ and further linked to the apertures $40_{13}$ and $40_{14}$. Both of these windings $50_1$ and $51_1$ are coupled to the ferromagnetic material on each side of every aperture to which they are linked in an opposite polarity. It is noted that whenever any of the windings 50 through 52 are coupled to any of the apertures 40 through 43 they are in every case linked to the magnetic material on each side of the corresponding aperture in an opposite polarity. Also included in the first stage is the interstage coupling winding $52_1$, which is linked to the first stage core apertures $40_{14}$ and $40_{15}$, and also coupled to the aperture $41_{10}$ included in the multiapertured core 10, which is the first aperture included in the second shift register stage. Note that while the winding $52_1$ is shown open-circuited to the right of the aperture $40_{15}$ with two terminals designated A and B in order to simplify FIG. 1, these two terminals are actually directly connected to the corresponding terminals A and B shown coupled to the winding linking the aperture $41_{10}$. In addition, other terminals designated C and D, and E and F are shown in a similar manner.

The coupling windings 50 through 52 associated with the second, third and fourth register stages are connected in a manner identically paralleling that described for the first register stage except that the winding $52_4$ passing through the final aperture $43_{15}$ included in the fourth and last register stage is coupled to an output means 39.

An input information source 30 having two output terminals 90 and 91 is linked by an input winding 48 to the aperture $40_{10}$ included in the first shift register stage. The source 30 supplies the input binary information to be stored and advanced in the shift register, with the binary information being manifested by an input current flowing in a selected one of the two possible directions. Hereinafter, a current which leaves the terminal 90 and returns through terminal 91 of the source 30 will be regarded as an input binary "1," and an input "0" is represented by a current flowing in the opposite direction.

A clock source 35 is provided to sequentially supply current pulses to three switching and reset windings 110 through 112, with the source 35 supplying a pulse to only one of the windings 110 through 112 at any one time, and supplying pulses to each of the windings 110 through 112 in that order. The information source 30 is constrained by a synchronizing means 38 to supply an information digit only when the clock pulse source 35 is supplying an energization pulse to the switching and reset winding 110.

The winding 110 is coupled to the driving legs 20 and 20' included in the cores 10 and 11 to provide a counter-clockwise, or switching direction magnetomotive force throughout these cores, when a current pulse is supplied thereto. The winding 110 is also coupled to the driving legs 20 and 20', and the shunt legs 21 and 21', included in the cores 13 and 14 to provide a magnetomotive force to these cores in a clockwise, or reset direction. Similarly, the switching and reset winding 111 is coupled to the driving legs 20 and 20' and shunt legs 21 and 21' of the cores 10 and 15 in the clockwise, reset direction and also coupled to the driving legs 20 and 20' of the cores 12 and 13 in the counter-clockwise switching direction. Finally, the switching and reset winding 112 is coupled to the cores 14 and 15 in the switching direction and to the cores 11 and 12 in the reset direction.

Figure 2:
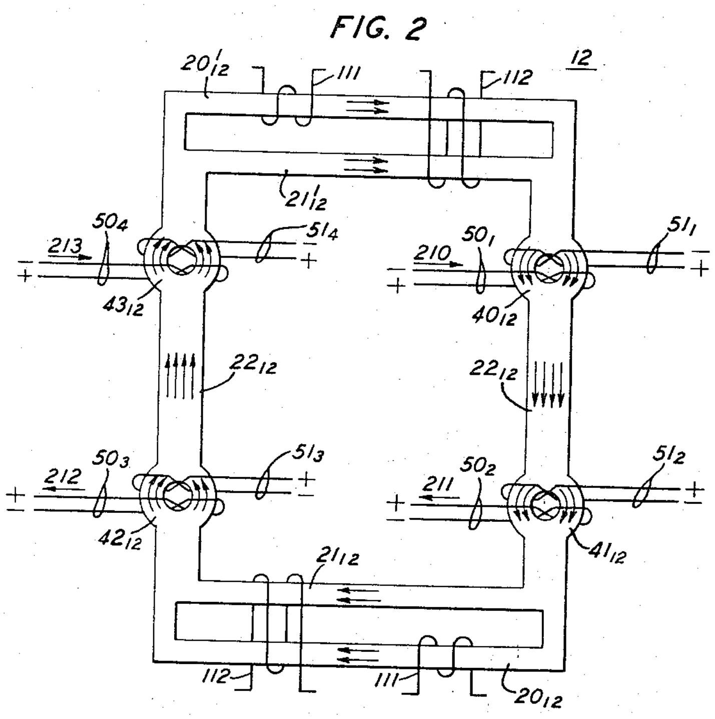
FIG. 2 is a diagram of a first magnetic condition for one of the multiapertured cores illustrated in FIG. 1.
Figure 3:
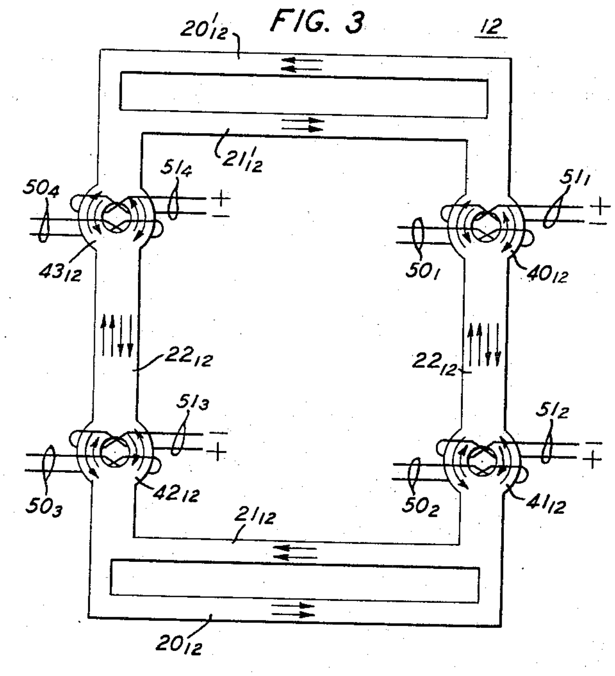
FIG. 3 is a diagram of a second magnetic condition for the multiapertured core illustrated in FIG. 2.

Before describing a typical sequence of circuit operation of the arrangement shown in FIG. 1, the circuit functioning of the core 12, which is typical of the plurality of cores 10 through 15, will be discussed along with the convention employed in FIGS. 2 and 3 to illustrate the magnetic condition of the ferromagnetic core legs of the illustrative core 12. Each vector shown in FIGS. 2 and 3 represents a measure of magnetic flux, with a larger vector representing more flux than a shorter vector. The total additive length of the vectors contained in any particular magnetic member indicates the flux-carrying capacity of the member and hence remains constant. The legs $20_{12}$ and $20'_{12}$ and $21_{12}$ and $21'_{12}$ will in every case have flux vectors whose total length is two flux units while each of the cross legs $22_{12}$ has flux vectors whose total length is four units. Accordingly, a total vector length of two flux units is contained in the ferromagnetic material on each side of the signal apertures $40_{12}$ through $43_{12}$. Where all the vectors in any magnetic member have a like orientation, the fluxes are additive and the material is in a maximum remanent condition. When two vectors are of opposite polarities, the longer of the vectors depicts the direction of flux flowing through the corresponding member, and the flux has a magnitude proportional to the vector difference. When the flux vectors have a net zero difference, the associated material is magnetically neutral thereby having no net magnetic flux flowing therethrough.

Assuming that the clock source 35 (FIG. 1) has last supplied a pulse to the winding 112 coupled to the driving legs 20 and 20' and shunt legs 21 and 21' included in the core 12, the energized winding 112 saturates the core 12 in a clockwise, reset polarity as shown in FIG. 2. Note in FIG. 2 that the units of flux flowing through all cross-sections of any individual one of the members $20_{12}$, $20'_{12}$, $21_{12}$, $21'_{12}$ and $22_{12}$ are identical, and the flux is conserved in each junction between any of the members. Hence, the fundamental physical principle that flux be continuous is satisfied.

Assume now that currents represented by the arrows 210 and 213 in FIG. 2 are flowing in the windings $50_1$ and $50_4$ towards the apertures $40_{12}$ and $43_{12}$, respectively, and that currents are flowing in an opposite direction, as indicated by the vectors 211 and 212, in the windings $50_2$ and $50_3$ coupled to the apertures $41_{12}$ and $42_{12}$, respectively.

When the winding 111 is next supplied with an energization pulse from the clock source 35, it generates a magnetomotive force which reverses the remanent hysteresis magnetization orientation in the driving leg $20_{12}$ from its previously right-to-left direction illustrated in FIG. 2 to a left-to-right orientation illustrated in FIG. 3. Similarly, the driving leg $20'_{12}$ switches its flux orientation and resides in a right-to-left orientation as shown in FIG. 3. Note that two units of flux now flow from left-to-right in FIG. 3 in the leg $20_{12}$ and return right-to-left in the shunting leg $21_{12}$. Also note that two units of flux flow in a closed magnetic path including the driving leg $20'_{12}$ and the shunt leg $21'_{12}$. It should be apparent that the energized driving winding 111 must also supply a switching magnetizing force to reverse two flux units in the cross legs 22 as no net flux can exist in either of these members under the above-described magnetic state of the driving legs $20_{12}$ and $20'_{12}$ and shunt legs $21_{12}$ and $21'_{12}$. If any flux were contained in either of the legs $22_{12}$ it would have to be returned through either a driving leg or a shunt leg, as lines of flux must be continuous, as mentioned above. However, each of the driving legs $20_{12}$ and $20'_{12}$ and shunt legs $21_{12}$ and $21'_{12}$ is in a saturated condition and, moreover, the driving leg $20_{12}$ and shunt leg $21_{12}$, and the driving leg $20'_{12}$ and shunt leg $21'_{12}$, already have two continuous units of flux flowing therethrough in two closed, completed magnetic paths. Hence, each of the cross legs $22_{12}$ is driven by the switching direction energization from a saturation condition to a neutral condition, as illustrated in FIG. 3.

The currents supplied to the windings $50_1$ and $50_4$ shown in FIGS. 2 and 3 produce magnetizing forces which tend to produce clockwise fluxes around the apertures $40_{12}$ and $43_{12}$, respectively. These magnetizing forces aid the switching winding magnetomotive force in the core material to the left of the aperture $40_{12}$ and the right of the aperture $43_{12}$ while opposing the switching magnetizing force on the opposite sides of these apertures. It is a well known physical principle of magnetics that the speed of domain wall motion, and thereby also the speed of square loop magnetic switching, is directly proportional to the applied magnetizing force. Therefore, since a larger force is applied to the material to the left of the aperture $40_{12}$ and the right side of the aperture $43_{12}$ than to the opposite sides of these apertures, the harder driven material surrounding each aperture switches at a more rapid rate of speed. Since the total flux switched in the material on both sides of each aperture is constrained to be two flux units, a greater portion of these two flux units is switched in the faster-switching material, resulting in a magnetization condition illustrated in FIG. 3.

In a mode of operation which parallels that described above, the currents flowing in the windings $50_2$ and $50_3$ shown in FIGS. 2 and 3 produce magnetomotive forces which tend to produce a counter-clockwise flux around each of the apertures $41_{12}$ and $42_{12}$, resulting in more flux being switched in the material to the right of the apertures $41_{12}$ and to the left of the aperture $42_{12}$. The convention employed hereinafter is that a clockwise and counterclockwise flux unbalance around a core aperture respectively represent the storage of a binary "1" and "0."

As mentioned above, the windings $51_1$ and $51_4$ are also coupled to the material on either side of the core apertures $40_{12}$ and $43_{12}$, respectively, in an opposite polarity. Hence, the signals induced by the switching of flux in the material on either side of a cross leg aperture ordinarily tend to have a cancelling effect on one another. However, as a larger flux change has occurred in the material to the left of the aperture $40_{12}$ and to the right of the aperture $43_{12}$ than transpired in the other sides thereof, the faster-switching material induces proportionally larger signals in the corresponding windings $51_1$ and $51_4$ than does the slower-switching material, which undergoes a smaller flux change. Hence, by a simple application of Lenz' law, it is apparent that voltages are induced in the windings $51_1$ and $51_4$ in the polarity shown in FIG. 3. In a like manner voltages of an opposite polarity are induced in the windings $51_2$ and $51_3$ associated with the apertures $41_{12}$ and $42_{12}$, respectively, as indicated in FIG. 3.

The core 12 is reset to its original magnetization condition illustrated in FIG. 2 by the next succeeding current pulse supplied to the winding 112 coupled to the driving legs $20_{12}$ and $20'_{12}$ and the shunt legs $21_{12}$ and $21'_{12}$ to produce a flux in the clockwise direction throughout the core. This energized winding switches two units of flux in each of the core legs $22_{12}$, $20_{12}$ and $20'_{12}$ thereby resetting the core to its initial magnetization condition. When the core is reset, resultant voltages are induced in each of the windings $50_1$ through $50_4$ and also in the windings $51_1$ through $51_4$, since the two units of flux which are switched in each of the cross legs $22_{12}$ divide unequally around each of the apertures $40_{12}$ through $43_{12}$. This flux division is, of course, directly dependent upon whether the magnetic unbalance around these apertures was in the clockwise or counter-clockwise direction when the cross legs $22_{12}$ were demagnetized. The polarity of the voltages induced in the associated intrastage coupling windings is indicated by the appropriate plus and minus signs associated with the coupling windings in FIG. 2.

With this basic core functioning in mind, a typical cycle of shift register circuit operation for the FIG. 1 arrangement will now be described. Assume first that the clock pulse source 35 supplies an energization signal to each of the windings 110 through 112, in that order, to set the cores 10 through 15 to the proper initial state, with no input information being supplied by the source 30. The first pulse, supplied to the winding 110, saturates the cores 13 and 14 to the reset direction while placing the cores 10 and 11 in the switched orientation with the cross legs $22_{10}$ and $22_{11}$ being in a magnetically neutral state. There will, of course, be no perturbations of continuous flux around the apertures 40 through 43 associated with the cores 10 and 11 as no input information is supplied by the source 30 and none exists in the system. When the source 35 next supplies a pulse to the winding 111, cores 10 and 15 are both switched to the clockwise, saturated, reset condition and the cores 12 and 13 are placed in a switched, neutral orientation with their cross legs 22 being demagnetized. Finally, the energized winding 112 returns the cores 11 and 12 to a clockwise, saturated, reset condition while placing the cores 14 and 15 in a switched, neutral condition. The proper initial conditions, viz., the cores 10 through 12 in a reset, clockwise saturated state and the cores 13 through 15 in a switched, netural condition with their cross legs 22 being demagnetized, are thereby established.

Assume now, that the information to be stored and advanced in the register consists of a two-bit binary word "01." At the time the next clock source pulse is supplied to the winding 110, the input information source 30 supplies a current pulse representing a binary "0" to the winding 48. This current flows outward from the terminal 91 and returns by means of the other output terminal 90. The cross legs $22_{10}$ included in the core 10 are driven from their previously saturated condition to a neutral magnetic condition, and the negative current pulse supplied by the input winding 48 produces a counter-clockwise remanent magnetic condition around the aperture $40_{10}$ in a manner described in detail above with respect to the core 12 and as illustrated in FIGS. 2 and 3. While this counter-clockwise perturbation around the aperture $40_{10}$ is being established, a current is being coincidently induced in the winding $50_1$ coupled to the aperture $40_{10}$ in the direction indicated by the arrow 120 which is shown alongside the winding $50_1$.

This current in the winding $50_1$ produces a counter-clockwise remanent flux around the aperture $40_{11}$ associated with the core 11 which is also being driven in response to the current pulse supplied to the winding 110 from a saturated condition to a switched condition with its cross legs magnetically neutral. It is noted that the current in the winding $50_1$ does not have any effect on the magnetic state of the ferromagnetic material surrounding the aperture $40_{12}$ to which it is also coupled because of its relatively small magnitude. In order for an energized, short-circuited coupling winding to have any effect on the magnetic condition of the material surrounding a core aperture, a change in the remanent flux throughout the entire core from a saturated state to a neutral state is coincidently required.

The energized winding 110 also switches the cores 13 and 14 from a neutral to a saturated, clockwise, reset condition. But, as there were no flux unbalances around any aperture included in these cores, no currents are induced in any of the coupling windings 51 or 52 associated with these cores. Hence, at the termination of the pulse supplied to the winding 110, a net flux perturbation in a counter-clockwise sense exists around the apertures $40_{10}$ and $40_{11}$ in response to the negative current which represented the binary "0" supplied by the source 30. At a discrete time interval following the pulse supplied to the winding 110, the clock pulse source 35 next energizes the winding 111. This winding resets the cores 10 and 15 from their previously neutral condition back to the clockwise, saturated, reset condition and also switches both the cores 12 and 13 from a saturated condition to a neutral condition. As the core 10 becomes reset, a current is again induced in the winding $50_1$ because of the unequal flux switching in the legs surrounding the aperture $40_{10}$, in a similar manner as was hereinabove described in the case illustrated in FIGS. 2 and 3 for the core 12. This current flows in an opposite direction from the vector 120. The energized coupling winding $50_1$ produces a counter-clockwise magnetic condition around the aperture $40_{12}$ contained in the core 12 which is being driven to a neutral condition by the winding 111. The magnitude of the current in the winding $50_1$ is insufficient to affect the remanent state of the core 11 which is not being changed from a saturated to a neutral condition by any of the windings 110 through 112. As the counter-clockwise flux is being established around the aperture $40_{12}$ a current is induced in the winding $51_1$ also coupled to the aperture $40_{12}$ in the direction of the vector 121 shown in FIG. 1 alongside the winding $51_1$. This current establishes a counter-clockwise remanent condition around the aperture 40 contained in the core 13 which is being driven to a neutral condition by the winding 111, but does not affect the aperture 40 included in the core 14 to which it is also coupled because this core is not being driven to a magnetically neutral state. It is noted that the energized winding 111 also resets the core 15 to a clockwise, saturated condition, but induces no current in any of the short-circuited coupling windings associated with the apertures $40_{15}$ through $43_{15}$ associated therewith, as the flux contained in the ferromagnetic material surrounding these apertures was in an initially balanced condition. Hence, summarizing the magnetic state of the cores 10 through 15 and the apertures $40_{10}$ through $40_{15}$ at this point of circuit operation, the cores 10, 14 and 15 are in a reset, saturated condition, and the cores 11, 12 and 13 are in a magnetically neutral condition with a counter-clockwise flux flowing in the ferromagnetic material surrounding the corresponding apertures $40_{11}$ through $40_{13}$ included therein.

To initiate the third phase of circuit functioning for the first operational cycle, the clock source 35 next energizes the winding 112. The magnetomotive force supplied by the winding 112 to the core 12 drives this core back to a clockwise, saturated condition thereby inducing a current in the winding $51_1$ in a direction opposite to the arrow 121. The current flowing in the intrastage short-circuited coupling winding $51_1$ does not affect the core 13 which is not being switched at this time, but does establish a counter-clockwise flux surrounding the aperture $40_{14}$ included in the core 14 which is being driven into a magnetically neutral condition by the winding 112. As the counter-clockwise flux is being established in the core 14 surrounding the aperture $40_{14}$, a current in the direction of the vector 122 is generated in the winding $52_1$ and this current establishes a counter-clockwise remanent flux state around the aperture 40 included in the core 15 which is also being driven to a neutral condition by the energized winding 112. The current in the winding $52_1$, as discussed above, does not affect the aperture 41 in the core 10 as this core is not being switched to a neutral magnetic condition during this third phase of circuit operation.

Also note that the energized winding 112 resets the cores 11 and 12, both of which are coupled to the intrastage coupling winding $50_1$. During this resetting operation, the core 12 induces a voltage in the winding $50_1$ in a polarity to generate current in a direction opposite to the vector 120, while the material surrounding the aperture $40_{11}$ included in the core 11 induces a voltage in the winding $50_1$ which is of an equal magnitude but an opposite polarity as that produced by the core 12. Hence, no net current is induced in the winding $50_1$, and there is no backward, or right-to-left propagation of information. As may be observed from the above and also from the discussion following hereinbelow, the major function of the odd-numbered cores 11, 13 and 15 is to prevent any rearward propagation of current when the even-numbered cores 12, 14 and 10, respectively, are reset to a clockwise, saturated magnetic condition. The cores 11, 13 and 15 accomplish this by cancelling the voltages that the cores 10, 12 and 14 induce in the backward direction in the coupling loops. Thus, at the termination of the first cycle of operation the cores 10 through 12 are saturated and the cores 13 through 15 reside in a magnetically neutral condition, which is the initial condition described above. Also note that a counter-clockwise flux exists in the ferromagnetic material surrounding the apertures $40_{13}$, $40_{14}$ and $40_{15}$ following the third clock phase. These flux conditions represent the storage of the binary "0" in the first shift register stage.

When the binary "1" is supplied by the input information source 30 to initiate the second cycle of operation, the clock pulse source 35 again energizes the winding 110. The energized winding 110 resets the core 14 to its clockwise, saturation, remanent condition, thereby inducing a current in the interstage winding $52_1$ in a direction opposite to the vector 122. This energized winding $52_1$ produces a counter-clockwise magnetomotive force in the ferromagnetic material surrounding the aperture $41_{10}$ included in the core 10 which is being driven to a neutral condition by the energized winding 110. Hence, the binary "0," which was the first information bit supplied by the input information source 30, at this time is registered in the first aperture $41_{10}$ of the second shift register stage. Concurrently therewith, the input information source 30 supplies a current to the input winding 48 which leaves the source output terminal 90 and returns through the terminal 91, which produces a clockwise, remanent condition around the aperture $40_{10}$. Hence, at the conclusion of the pulse supplied by the source 110 a binary "0" is registered in the core 10 by a counter-clockwise flux surrounding the aperture $41_{10}$ and a binary "1" is registered in the core 10 by a clockwise flux contained in the ferromagnetic material surrounding the aperture $40_{10}$. Also note that the energized winding 110 has functioned to reset the cores 13 and 14. As described above, these cores induce equal and opposite potentials in the winding $51_1$ coupled thereto, and hence there is once again no backward propagation of intelligence. Also note that the energized winding 110 also switches the core 11 from a previous, saturated condition to a neutral condition, and hence, as the clockwise and counter-clockwise fluxes are being established in the ferromagnetic material surrounding the apertures $40_{10}$ and $41_{10}$, respectively, currents are induced in the coupling windings $50_1$ and $50_2$ which generate clockwise and counter-clockwise flux states in the material surrounding the apertures $40_{11}$ and $41_{11}$, respectively.

During the second clock phase, the energized winding 111 resets the core 10 and neutralizes the cores 12 and 13. During this process, the information contained in the ferromagnetic material surrounding the apertures $40_{10}$ and $41_{10}$, respectively, produces clockwise and counterclockwise flux conditions surrounding the apertures $40_{12}$ and $40_{13}$, and $41_{12}$ and $41_{13}$, respectively, in an identical manner as was described above during the first cycle of operation. Also, the core 15 is reset concurrently with the core 10 to prevent any backward propagation of energy by inducing cancelling voltages in the interstage coupling loop $52_1$. During the final clock phase of the second cycle, the energized winding 112 resets the core 12, and the information contained therein is stored in the material surrounding the apertures 40 and 41 included in the cores 14 and 15, which are driven to a neutral condition. The energized winding 112 also resets the core 11 to produce voltages in the coupling windings $50_1$ and $50_2$, which are equal and opposite to those induced by the unbalanced flux included in the ferromagnetic material surrounding the apertures $40_{12}$ and $41_{12}$. Hence, completing the second cycle of operation, the cores 10 through 12 are again saturated and the cores 13 through 15 are also in their initial neutral magnetic state, with the input information residing in the polarity of the remanent flux surrounding the apertures 40 and 41 included in the cores 13 through 15.

When the clock source 35 again energizes the winding 110, the core 14 is reset and currents are induced in the interstage coupling windings $52_1$ and $52_2$, to produce a remanent counter-clockwise flux perturbation surrounding the aperture $42_{10}$ and a clockwise flux perturbation surrounding the aperture $41_{10}$, corresponding to the binary "0" being registered in the third register stage and the binary "1" being registered in the second register stage. The material surrounding the aperture $40_{10}$ included in the first stage will assume an orientation depending upon the nature of the coincidently supplied next input information bit.

The propagation of intelligence described above continues in response to the clock pulse source alternately energizing the windings 110 through 112 in that order, and the information is advanced through the first through fourth register stages, in that order. After information has been registered in the fourth stage, the next succeeding pulse supplied to the winding 110 will reset the core 14 and induce a current in the interstage winding $52_4$ in a direction dependent upon the direction of remanent flux which surrounded the aperture $43_{14}$. The current is directly supplied to the output means 39 which distinguishes between a binary "1" and "0" by the direction of this current flow. Hence, it is observed that information emanating from the source 30 has been registered in the FIG. 1 shift register in response to the clock pulse source supplying energization to the winding 110 and circulated through the four register stages as the switching and reset windings 110 through 112 were sequentially supplied with a series of pulses.

It should be apparent at this point that any flux flowing in the cross legs 22 of the cores 10 through 15 should advantageously have a propensity for dividing equally in the ferromagnetic material on each side of each of the apertures 40 through 43 in the absence of any energized conductors passing through the aperture. To enhance this flux division, the outer extremeties of the rectangular core apertures formed by the driving legs 20 and 20' with the shunt legs 21 and 21', respectively, are made colinear with the centers of the apertures 40 through 43. This symmetry aids the balancing of flux in the cross legs 22.

Also, only one of the driving legs 20 and 20' and an associated one of the shunt legs 21 and 21' is, in fact, essential for circuit operation, and the redundant members may simply be replaced by a magnetic member, having no windings linked thereto and characterized by a like flux capacity as each of the cross legs 22. However, the two driving legs 20 and 20' and the two shunt legs 21 and 21' are employed in the illustrative embodiment shown in FIG. 1 simply to make the cores symmetrical and thereby further enhance the balancing of flux through the cross legs 22 associated therewith.

In addition, it is by no means essential to the operation of the present invention that equal flux capacities and therefore equal units of flux be employed in the driving legs and shunt legs. For example, if the flux capacities of the cross, driving and shunt legs were $m$, $k$ and $m-k$ units respectively, where $m$ is greater than $k$, and the driving legs were initially set with $k$ units of flux, and the cross legs biased with $m$ units of flux, then the shunt legs would contain $m-k$ quiescent flux units. Then, when the switching winding reverses the orientation of the $k$ flux units contained in the driving legs, the orientation of $k$ units of flux in the cross legs would also have to reverse. In the special case where $m$ equals $k$, as employed in an application by E. E. Newhall, Ser. No. 580,542, filed Sept. 20, 1966, which is a continuation-in-part of the cofiled E. E. Newhall application, Ser. No. 241,375, filed Nov. 30, 1962, and now abandoned, the shunt legs may be deleted. As in the mode of operation described hereinabove, signals would be induced in the coupling windings associated with apertures coupled to an energized input winding in a polarity dependent upon the direction of residual flux being switched around the corresponding aperture.

By employing driving legs with a small flux capacity, the net amount of flux reversed in the entire core decreases when the driving legs are driven between remanent conditions by the switching and reset windings. If smaller magnitudes of flux are switched, the core dissipates less heat, as core heating is directly proportional to the flux switched therein. As is well known, a decrease in the heating of a magnetic core allows the core to be operated at a higher repetition rate, which is a desirable advantage. Under these conditions, however, the magnitude of the output signals would also decrease proportionally.

Still further, it is also noted that each shift register stage may advantageously be employed as a delay element, as shown in a cofiled application by E. E. Newhall, Ser. No. 241,261, filed Nov. 30, 1962 and now U.S. Patent No. 3,293,621. The output information supplied to the interstage winding 52 included in any particular stage during an energization of the winding 110 is identical to the information supplied to that stage by the winding 52 included in the previous stage three discrete time intervals earlier when the winding 110 was last energized.

It is also noted that selected ones of the windings 50 through 52 may advantageously be coupled to selected cores by a plurality of turns. This has the practical effect of compensating for any losses which may be contained in the system.

Summarizing, an illustrative magnetic core shift register made in accordance with the principles of the invention employs six ferromagnetic multiapertured cores. Each core includes two driving legs, each shunted by a magnetic member of a like cross-sectional area. Two cross legs are provided to complete a magnetic path which also includes the driving legs. Each cross leg member has a uniform cross-sectional area which is twice the magnitude of that possessed by each of the driving and shunt legs and, corresponding to an $n$-stage shift register, $n$ apertures are centrally located along the long axes of the cross legs.

Each stage of the register comprises six core apertures including one from each core, with first and second short-circuited windings being respectively coupled to the apertures in the first three, and third through fifth cores. In addition, a third short-circuited winding couples the apertures included in the last two cores of each stage to the first core aperture of the succeeding stage. Each of the above windings is coupled to the ferromagnetic material on each side of the corresponding core aperture in an opposite polarity. Binary input information is supplied to an input winding coupled to the first aperture of the first shift register stage, and is manifested by the presence of an input current flowing in one of the two possible directions.

Information is stored and advanced in the register in response to pulses supplied by a three-phase clock source which selectively switches and resets each of the six multiapertured cores between a saturated and a neutral magnetic condition.

It is to be understood that the above-described arrangements are only illustrative of the application of the principles of the present invention. Numerous other arrangements may be devised by those skilled in the art without departing from the spirit and scope of this invention. For example, a plurality of information bits may be simultaneously registered in each of the apertures $40_{10}$ through $43_{10}$ by employing three additional input windings coupled to the apertures $41_{10}$ through $43_{10}$. Hence, four information bits could be simultaneously registered in the shift register, and the cycling of the clock source 35 would then serve to advance the input information by one stage when each of the windings 110 through 112 had been once energized. In response to each energization of the winding 112, a current flowing in one of two possible directions, indicating one of the two binary characters, is supplied to the output means 39. Hence, such an arrangement functions as a binary parallel-to-series converter.

Also note, that four apertures were chosen for purposes of illustration, but any number of apertures may be included in the cross legs 22 of each of the cores 10 through 15. In general terms, corresponding to an *n*-stage shift register, *n* apertures would be included in each of the cores 10 through 15. Note, however, that independent of the number of stages employed, the number of cores remains fixed.

Also, the windings 110 through 112 have been employed to saturate and reset selective cores 10 through 15 and have been coupled to both the driving and shunt legs included in the cores. The reset function would also be accomplished if the approximate windings were coupled to a cross leg 22 included in the corresponding cores.

Further, the two different binary characters supplied by the input source 30 may advantageously be manifested by the presence or absence of current, as well as by a current flowing in one of the two possible directions as employed hereinabove.

What is claimed is:

1. In combination in a multistage shift register, six square loop ferromagnetic multiapertured cores, each of said cores including cross leg means having a plurality of apertures located on the long axis thereof, each of said cores further including driving leg means completing a closed magnetic path through said cross leg means, shunt leg means connected in parallel with each of said driving leg means, each of said register stages comprising first, second and third short-circuit windings and an aperture included in each of said cores, said first winding of each stage being coupled to an aperture included in each of the first, second and third ones of said cores, said second winding also being coupled to said aperture included in said third core and also coupled to an aperture included in each of the fourth and fifth cores, and said third short-circuited winding being coupled to said aperture in said fifth core and further coupled to an aperture included in said sixth core and to an input core aperture included in the next succeeding register stage.

2. A combination as in claim 1 further including a clock pulse source including a first, second and third output terminal, said clock pulse source alternately energizing said first, second and third output terminals, a first clock winding coupled to said driving leg means of said first and second cores in a first polarity and coupled to said driving and shunt leg means of said fourth and fifth cores in a second polarity, a second clock winding coupled to said driving leg means included in said third and fourth cores in said first polarity and coupled to said driving and shunt leg means of said first and sixth cores in said second polarity, and a third clock winding coupled to said driving leg means included in said fifth and sixth cores in said first polarity and coupled to said driving and shunt leg means included in said second and third cores in said second polarity, said first, second and third clock windings being respectively connected to said first, second and third clock source output terminals.

3. A combination as in claim 2 further including an information source and an input winding coupled to the aperture included in said first core and associated with said first shift register stage, said input winding being connected to said input source.

4. A combination as in claim 3 further including output means connected to said third coupling winding included in the last shift register stage.

5. In combination, a plurality of magnetic circuits, each of said circuits comprising a first and second square-loop magnetic member connected in parallel and a flux source connected in series therewith, and a permanently-closed short-circuited winding loop coupled to said first and second magnetic members included in each of said plurality of magnetic circuits and not coupled to any other portion of said magnetic circuits.

6. A combination as in claim 5 wherein said short-circuited winding is coupled to said first and second magnetic members included in each of said magnetic circuits in opposite polarities.

7. A combination as in claim 6 further including a flux source controlling means for enabling selected ones of said flux sources to supply a first magnitude of flux and for enabling the remainder of said flux sources to supply a second magnitude of flux to said associated parallel-connected magnetic members.

8. A combination as in claim 7 further including a plurality of second magnetic circuits, each of said second magnetic circuits comprising two parallel-connected magnetic members, each of said second magnetic circuits being serially connected with one of said first magnetic circuits.

9. A combination as in claim 8 further including a plurality of short-circuited windings, each of said windings being coupled to each member of a plurality of said second magnetic circuits, said windings being coupled to one of said members of each of said circuits in a first polarity and coupled to the other member in a second polarity.

10. In combination in an *n*-stage magnetic core shift register, where *n* is any positive integer, first through sixth, inclusive, square loop, ferromagnetic, multiapertured cores, each of said cores including a driving leg, a shunt leg and a cross leg, said driving leg being connected to said cross leg thereby completing a closed magnetic path which also includes said cross leg, said shunt leg being connected in parallel with said driving leg, *n* apertures included in said cross leg included in each of said magnetic cores, *n* first intrastage coupling windings, *n* second intrastage coupling windings, and *n* interstage coupling windings, each of said first *n* windings being coupled to three different apertures including one from each of said first, second and third cores, said second *n* windings each being coupled to three different apertures including one from each of said third, fourth and fifth cores, $n-1$ of said *n* interstage windings each being coupled to three different apertures including one from each of said first, fifth and sixth cores, and one of said interstage windings being coupled to two different apertures including one from each of said fifth and sixth cores.

11. A combination as in claim 10 further including a clock pulse source having a first, second and third output terminal, said clock pulse source sequentially energizing said first, second and third output terminals, a first clock winding coupled to said driving leg of said first and second cores in a first polarity and coupled to said driving and shunt legs of said fourth and fifth cores in a second polarity, a second clock winding coupled to said driving legs included in said third and fourth cores in said first polarity and coupled to said driving and shunt legs of said first and sixth cores in said second polarity, and a third clock winding coupled to said driving leg included in said fifth and sixth cores in said first polarity and coupled to said driving and shunt legs included in said second and third cores in said second polarity, said first, second and third clock windings being respectively connected to said first, second and third clock source output terminals.

12. In combination in a magnetic core circuit, a plurality of ferromagnetic cores each including a plurality of driving legs, a like plurality of cross legs and a like plurality of shunt legs, each of said driving legs and each of said cross legs being serially interconnected to form a closed magnetic path, each of said shunt legs being connected in parallel with a different one of said driving legs, said cross legs including a plurality of apertures centrally located thereon, and a plurality of short-circuited coupling windings, each of said windings being coupled to one aperture included on each of a plurality of cores, said windings being coupled to the ferromagnetic material on each side of each aperture to which they are coupled in an opposite polarity.

13. A combination as in claim 12 wherein said driving legs, cross legs and shunt legs are respectively characterized by flux-carrying capacities of $k$, $m$ and $m-k$ flux units, where $k$ and $m$ are real positive numbers.

14. In combination, a plurality of magnetic circuits each including a flux source and two shunt-connected square-loop magnetic members connected to said flux source thereby forming two closed flux paths each of which includes the flux source and a different one of said magnetic members, an input winding coupled to each magnetic member of one of said magnetic circuits and a permanently-closed short-circuited coupling winding coupled only to each magnetic member included in each of said magnetic circuits.

15. A combination as in claim 14 further including means for controlling the amount of flux supplied by each of said flux sources, and said input winding and said short-circuited coupling winding being linked in an opposite polarity to each magnetic member of said magnetic circuits to which they are coupled.

References Cited

UNITED STATES PATENTS

| | | | |
|---|---|---|---|
| 2,519,426 | 8/1950 | Grant | 340—174 |
| 2,769,122 | 10/1956 | Moreines | 340—174 |
| 2,805,407 | 9/1957 | Wallace | 340—174 |
| 2,927,220 | 3/1960 | Crane | 340—174 |
| 2,733,424 | 1/1956 | Chen | 340—174 |
| 3,045,215 | 7/1962 | Gianola | 340—174 |
| 3,059,224 | 10/1962 | Post | 340—174 |
| 3,077,583 | 2/1963 | Russell | 307—88 |
| 3,106,702 | 10/1963 | Haynes | 340—174 |
| 3,213,436 | 10/1965 | Landgraf | 340—174 |

BERNARD KONICK, *Primary Examiner.*

JAMES W. MOFFITT, *Examiner.*

M. S. GITTES, *Assistant Examiner.*